Nov. 13, 1928.
C. ST. C. BURNS
1,691,867
FILTER
Original Filed Jan. 23, 1926
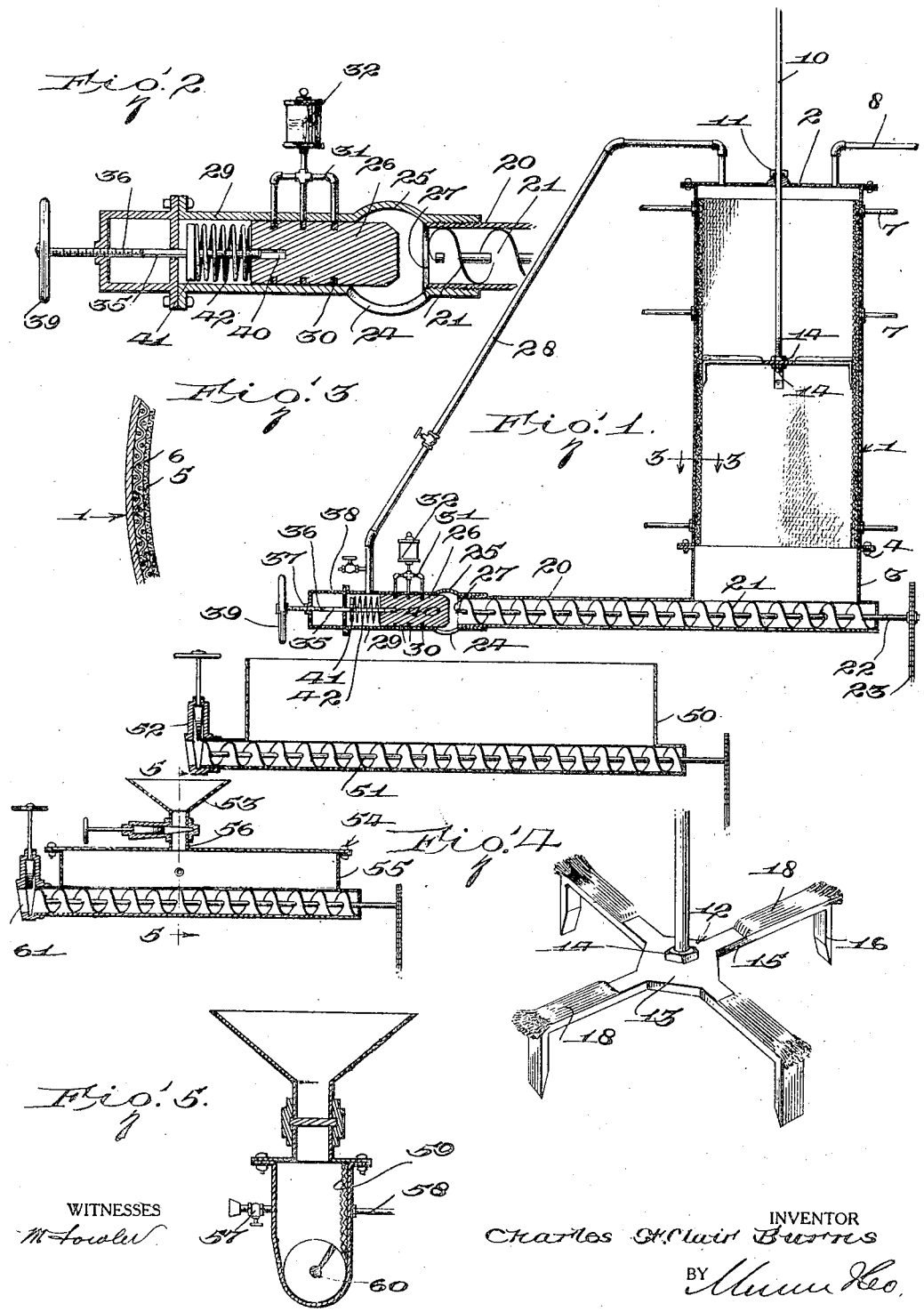
WITNESSES
INVENTOR
Charles St.Clair Burns
BY
ATTORNEYS Patented Nov. 13, 1928.

1,691,867

UNITED STATES PATENT OFFICE.

CHARLES ST. CLAIR BURNS, OF PORT ARTHUR, TEXAS, ASSIGNOR OF ONE-HALF TO FOIST KAY, OF PORT ARTHUR, TEXAS.

FILTER.

Application filed January 23, 1926, Serial No. 83,403. Renewed September 26, 1928.

This invention relates in general to filters, and more particularly to continuous pressure filters.

The object of the invention is to provide a filter wherein the filtering operation is carried out under pressure and yet is continuous by virtue of the fact that the separated solids which tend to retard filtration are automatically discharged in such a novel and efficient manner as not to interfere with the filtering operation, thereby avoiding interruption and a consequent waste of time.

A further object is to provide a filter of this character and having this advantage, which is simple and durable in construction, reliable in operation, and easy and comparatively inexpensive to manufacture.

Other objects and advantages reside in certain novel features of the construction, arrangement and combination of parts which will be hereinafter more fully described and particularly pointed out in the appended claims, reference being had to the accompanying drawing forming a part of this specification, and in which:

Figure 1 is a view partly in section and partly in elevation showing an apparatus embodying the present invention, Figure 2 is a detail view partly in section and partly in elevation showing the balance discharge valve assembly, Figure 3 is a fragmentary sectional view showing the filtering means, Figure 4 is a fragmentary perspective view showing the means for removing the excess solids from the filtering means, and Figure 5 is a sectional view on the line 5—5 of Figure 1.

Referring to the drawings, the numeral 1 designates a cylindrical tank having its upper end closed by an end plate 2. To the lower end of the tank a short cylinder 3 is suitably secured as at 4. The tank 1 provides a filter chamber and the cylinder 3 provides a sludge chamber. The cylindrical wall of the tank 1 is alined with layers of reticulated material designated at 5 and 6. The layers 5 and 6 may be of wire mesh or any other suitable filtering material, and these layers overlie filtrate discharge pipes 7 which are connected to the cylindrical body of the tank. The liquid or fluid to be filtered is fed into the tank 1 through a delivery or inlet pipe 8 after it has been mixed in any suitable manner with a filtering medium which may be clay, fuller's earth, bone char, filter cel or the like. This fluid or liquid with the filtering medium dissolved therein is forced under pressure in through the pipe 8 into the tank 1. The filtering medium builds up on the inner layer 5 and the purified and cleared fluid or liquid passes out through the filtrate offtake pipes 7.

For the purpose of removing the excess solids which build up on the inner layer 5, cleaning means is provided for removing such excess solids and depositing them in the sludge chamber 3. This cleaning means includes a shaft 10 rotatably and slidably fitted in a stuffing box 11 provided in the head or end plate 2. The shaft 10 is rotated and reciprocated by any suitable power mechanism and gearing. At its lower end the shaft 10 has secured thereto a spider 12 having a hub 13 fastened by nuts 14 to the shaft 10 and having radial arms 15 terminating in scraper blades 16, the scraper blade 16 being extended angularly with respect to the spider arms. Wire brushes 18 are fixed to the spider arms 15 and project beyond the outer ends thereof. When the shaft 11 is rotated and reciprocated both the scraper blade 16 and the wire brushes 18 operate to remove the excess solids from the inner layer 5 of the filtering means. The excess solids so removed fall down into the slude chamber 3.

The sludge chamber 3 has a lateral offtake pipe 20 communicating therewith, and in this off-take pipe 20 a spiral conveyor 21 is operatively mounted. The conveyor 21 extends not only through the off-take pipe, but also across the bottom of the sludge chamber. The spiral conveyor 21 is mounted on a shaft 22 driven by chain and sprocket gearing 23 from any suitable source of power. When the conveyor 21 is operated it carries the solids from the sludge chamber 3 through the off-take pipe 20 and tends to discharge the same through a discharge chamber 24 provided in a discharge fitting 25 suitably fastened to the off-take pipe.

Means is provided for automatically controlling the discharge in such manner as to prevent loss of pressure from the filtering tank 1 and this means consists of a balanced valve 26 cooperable with a valve seat 27 formed within the discharge fitting at the end of the off-take pipe 20. When the valve 26 is closed it prevents discharge through the discharge opening 24. On one side the valve is subjected to pressure of the tank 1 exerted through the sludge in the off-take pipe 20 and the opposite side of the valve is also subjected to the pressure in the tank 1 by virtue of the provision of a pipe 28 leading from the tank 1 into the cylindrical extension 29 of the discharge fitting 25. It is in this cylindrical extension 29 that the valve 26 is slidably fitted. The valve 26 is preferably of the piston type, and has a plurality of peripheral grooves 30 which are adapted to contain piston rings for holding pressure that comes through pipe 28 against back of valve. Lubricant is supplied through feed tubes 31 from a lubricant supply cup 32 to the cylinder 29.

It may be desirable to subject the valve 26 to pressure over and beyond that existing in the tank 1, and again it may be desirable to positively close this valve 26. The present invention provides means for accomplishing these purposes, and preferably such means consists of a shaft 35 having a screw threaded portion 36 operatively engaged with a nut or threaded bearing 37 provided in a cap 38 fastened to the cylindrical extension 29 of the discharge fitting 25. At its outer end shaft 35 has a hand wheel 39 fixed thereto. At its inner end the shaft 35 is slidably fitted in an opening 40 provided in the adjacent end of the valve 26. A collar 41 is fixed to an intermediate portion of the shaft 35 and serves as an abutment for one end of a coil spring 42, the opposite end of the spring 42 abutting the adjacent end of the valve 26. The shaft 35 may be turned to cause the abutment 41 to place the spring 42 under the desirable tension. When the spring 42 is placed under tension it exerts pressure against the valve 26 which tends to close the same. Moreover when the shaft 35 is turned to a certain predetermined extent its inner end engages the inner end wall of the opening 40 to positively force the valve 26 against its seat 27.

The sludge discharged through the opening 24 falls into a sludge vat 50 from which it may be discharged by a power operated and screw conveyor 51 through a valve controlled discharge orifice 52 into a hopper 53 of a washing and steaming unit 54. The washing and steaming unit comprises a closed tank or chamber 55 with which the hopper connects through a valve controlled pipe 56. Steam may be supplied into the chamber through a valve controlled steam supply pipe 57. The fluids pass out through a filtrate pipe 58 after passing through filtering means 59. The washed solids may be carried off by power operated screw conveyors 60 through a valve controlled discharge 61.

I claim:—

1. A filter including a closed filtering chamber, filtering means therein, means for supplying fluid to be filtered to the chamber, means for cleaning off the excess solids from the filtering means, means for discharging said solids, having a discharge outlet, a valve cooperable with the outlet for controlling the discharge of the solids, one side of the valve being subjected to the pressure within the chamber exerted through the solids being discharged, means for subjecting the opposite side of the valve to the pressure within the chamber, and yieldable means tending to close the valve.

2. A filter including a closed filtering chamber, filtering means therein, means for supplying the fluid to be filtered to the chamber, means for cleaning off the excess separated solids from the filtering means, means for discharging said solids, and a balanced valve controlling said discharge, said balanced valve being subjected on one side to the pressure within the chamber exerted through the solids being discharged, and means for subjecting the other side of the valve to the pressure within the chamber.

3. A filter including a closed filtering chamber, filtering means therein, means for supplying the fluid to be filtered to the chamber, means for cleaning off the excess separated solids from the filtering means, means for discharging said solids, a balanced valve controlling said discharge, said balanced valve being subjected on one side to the pressure within the chamber exerted through the solids being discharged, means for subjecting the other side of the valve to the pressure within the chamber, and means for positively closing the valve.

4. A filter including a closed filtering chamber, filtering means therein, means for supplying the fluid to be filtered to the chamber, means for cleaning off the excess separated solids from the filtering means, means for discharging said solids, a balanced valve controlling said discharge, said balanced valve being subjected on one side to the pressure within the chamber exerted through the solids being discharged, and means for subjecting the other side of the valve to the pressure within the chamber, and means for supplying additional pressure to said other side to tend to force the valve to closed position.

5. A filter including a closed filtering chamber, filtering means therein, means for supplying the fluid to be filtered to the chamber, means for cleaning off the excess separated solids from the filtering means, means for discharging said solids, a balanced valve controlling said discharge, said balanced valve being subjected on one side to the pressure within the chamber exerted through the solids being discharged, means for subjecting the other side of the valve to the pressure within the chamber, means for supplying additional presure to said other side to tend to force the valve to closed position, and means for closing said valve.

6. A filter including a closed filtering chamber, filtering means therein, means for supplying the fluid to be filtered to the chamber, means for cleaning off the excess separated solids from the filtering means, means for discharging said solids, a balanced valve controlling said discharge, said balanced valve being subjected on one side to the pressure within the chamber exerted through the solids being discharged, means for subjecting the other side of the valve to the pressure within the chamber, an adjustable shaft, means for adjusting the shaft, a spring engaged with the valve, an abutment for said spring controlled by the shaft whereby the spring may be tensioned to subject the valve to the desired closing force, one end of said shaft being positively engageable with the valve to effect positive closing thereof in certain adjustments of the shaft.

7. A filter including a closed filtering chamber, filtering means therein, means for supplying the fluid to be filtered to the chamber, means for discharging the solid filtered out by the filtering means, a balanced valve controlling said discharge, said valve being subjected on one side to the pressure within the chamber exerted through the solid being discharged, means for subjecting the other side of the valve to the pressure within the chamber, an adjustable shaft, means for adjusting the shaft, a spring engaged with the valve, means controlled by the shaft whereby the spring may be tensioned to subject the valve to the desired closing force, one end of the shaft being positively engageable with the valve to effect positive closing thereof in certain adjustments of the shaft.

CHARLES ST. CLAIR BURNS.